United States Patent [19]
Brockdorff

[11] Patent Number: 6,036,863
[45] Date of Patent: Mar. 14, 2000

[54] REACTOR FOR USE IN WATER TREATMENT AND MICRO FILM CARRIERS FOR USE IN CONNECTION WITH SAID TREATMENT AS WELL AS A METHOD FOR OPERATING THE REACTOR

[76] Inventor: Knud Peter Brockdorff, Bauerlandstrasse 80, Flensburg 24939, Germany

[21] Appl. No.: 08/776,109

[22] PCT Filed: Jul. 21, 1995

[86] PCT No.: PCT/DK95/00316

§ 371 Date: Jan. 21, 1997

§ 102(e) Date: Jan. 21, 1997

[87] PCT Pub. No.: WO96/03351

PCT Pub. Date: Feb. 8, 1996

[30] Foreign Application Priority Data

Jul. 21, 1994 [DK] Denmark .................................. 0865/94
Mar. 22, 1995 [DK] Denmark .................................. 0290/95

[51] Int. Cl.[7] ...................................................... C02F 3/08
[52] U.S. Cl. .......................... 210/616; 210/150; 210/218
[58] Field of Search ................................... 210/615–618, 210/150, 151, 218, 220; 261/DIG. 70

[56] References Cited

U.S. PATENT DOCUMENTS

| | | |
|---|---|---|
| 3,966,599 | 6/1976 | Burkhead .................................. 210/618 |
| 4,256,573 | 3/1981 | Shimodaira et al. .................... 210/618 |
| 4,839,053 | 6/1989 | Tharp ....................................... 210/616 |
| 5,217,616 | 6/1993 | Sanyal et al. ............................ 210/617 |
| 5,458,779 | 10/1995 | Odegaard ................................ 210/616 |
| 5,543,039 | 8/1996 | Odegaard ................................ 210/150 |
| 5,690,819 | 11/1997 | Chianh .................................... 210/616 |

*Primary Examiner*—Thomas G. Wyse
*Attorney, Agent, or Firm*—Watson Cole Grindle Watson, P.L.L.C.

[57] ABSTRACT

In a reactor for water treatment of the type that contains particle-like carriers on which a biofilm grows that generates a desired decomposition of the contamination, a forced current is created such that the water in another current flows downwardly. In a special embodiment the upwardly flowing current is created in a tube. The reactor proves to be exceptionally effective and can be utilized together with other water purification and water treatment equipment. It is a distinctive feature that the downflowing current tears air down thus causing an exceptionally high oxygen concentration in the water. The reactor can furthermore be used for denitrification. Among other things the invention provides a minibiological purification plant servicing a single or very few households. As micro film carriers are preferably used, particles having an outwardly open cell structure for increasing the total effective surface area.

8 Claims, 5 Drawing Sheets

REACTOR FOR USE IN WATER TREATMENT AND MICRO FILM CARRIERS FOR USE IN CONNECTION WITH SAID TREATMENT AS WELL AS A METHOD FOR OPERATING THE REACTOR

BACKGROUND OF THE INVENTION

1. Field of the Invention

The invention relates to a reactor for use in water treatment and to micro film carriers for use in connection with the treatment, as well as to a method for operating the reactor. More specifically the invention relates to a reactor of the type in which the water is conveyed through the reactor which contains particle-like carriers on which a biofilm grows that generates the desired decomposition of the contamination.

2. The Prior Art

An example of such a reactor is described in Norwegian patent specification NO-B 172 687 in which the untreated water is introduced at the bottom of the reactor and at the water pressure in the inlet. The water rises up through the reactor and leaves through an outlet at the top. Due to the flow conditions the microfilm carriers will have a tendency to clot in the upper part of the reactor, and accordingly the reactor will not be so effective at the lower part.

In the reactor a biofilm is rapidly created on the plastic particles. On the outer surfaces the biofilm is abraded as the plastic particles rub against each other due to the flow in the reactor. On the exposed surfaces a continuous removal of dead microorganisms takes place such that the carriers always appear with a new active biofilm. It is different for the interior surfaces of the plastic particles; in the beginning the interior surfaces are active, but they rapidly become choked and can be completely sealed by dead biofilm, such that the interior surfaces rapidly become inactive. The dead biofilm leaves a black coating on the plastic particles which is difficult to remove. Among others this condition results in the fact that for the cylindrical plastic particles shown in FIG. 1 in the Norwegian patent specification one can only calculate with an effective surface of 57% of the total surfaces, thus approximately the same effectivity as for a solid plastic particle.

The phenomenon with dead biomaterial is especially critical for recirculated water for aqua cultures for which very strict requirements for the quality of the water are stipulated. Further, there is a requirement for a high degree of efficiency as it is necessary to place the plants indoors to avoid temperature fluctuation. Fish roe and fry require constant temperature conditions to develop at their optimum. Accordingly, the plants should be as compact as possible, such that the plants consume a minimum of space in the building.

SUMMARY OF THE INVENTION

According to the invention a bioreactor of the type mentioned in the preamble for water treatment, especially of recirculated water for aqua cultures, is characterized in that the reactor has means for creating a flow of water and microfilm carriers toward a central area of the reactor where a concentration of the microfilm carriers takes place in a concentrated current. This design of the reactor proves to be surprisingly efficient. Under the same conditions this entails that the size of a water treatment plant can be reduced considerably in comparison with known plants, whereby the investment and working expenses can be reduced.

Movement of the microfilm carriers can be made in different manners, e.g., by a special arrangement of air supply to the water, arrangement of the inlet and outlet to and from the reactor, or by jet streams. A particularly simple design of the reactor which is also easy to control is characterized in that it includes comprises a vertical tube preferably adjustably raised a distance over the bottom of the reactor and such that an adjustable flow up through the tube is created together with a concentration of microfilm carriers in the tube. The high concentration of microfilm carriers in the tube results in itself in a very efficient abrasion of dead biofilm material as an intense and heavy rubbing of the carriers against each other takes place as the flow velocity further is considerably higher than in the other areas of the reactor.

In vessels with stagnant water added, air would rapidly diffluent up through the water and vanish and a simple mechanical stirring would promote this tendency. However, according to the invention it appears that air is drawn down by the downward current, i.e., that the water under the same conditions contains a considerable higher oxygen concentration than referred to above which assists the effectiveness of the reactor. By extreme demands upon the oxygen concentration there could of course be added pure oxygen to the reactor.

A further quality of the reactor is that it promotes liberation of $CO_2$ and similar volatile gases, i.e., the reactor promotes expulsion of undesired volatile gases.

By addition of air/oxygen a much better absorption in the water is achieved when the air/oxygen is added underneath or internally, especially at the lower end of the tube and up through this at the same time causing a heavy stirring of the microfilm carriers and thereby a more efficient cleaning of these takes place, likewise the air stream in itself tears dead biofilm material off the carriers.

The flow through the tube can be controlled by adjusting the added amount of air/oxygen and the distribution thereof and by the distances of the tube in relation to the bottom of the reactor being adjustable.

The lower end of the tube can be funnel-shaped to ease the supply of the water, microfilm carriers and oxygen if added to the tube. This can be a separate funnel which can be displaced up and down along the tube for adjusting the distance to the bottom.

It should be mentioned that the reactor can contain a number of tubes arranged in a suitable pattern. The water inlet can be arranged in alignment with the concentrated flow e.g. just beneath this or shared out under a number of tubes and thereby promoting the flow.

At the side walls the water is more or less stagnant. To counteract this air/oxygen supply is arranged at the bottom at the side walls. Simultaneously this prevents sedimentation at the side walls which also can be counteracted by making the reactor bottom curved or funnel-shaped toward the inlet. The upward current must of course be conformed to the downward current around the tube.

Accordingly the air/oxygen is added in a counter current which to a very high degree promotes the absorption of air/oxygen and at the same time the water in this area flows slowly which further results in a long time of contact between the air/oxygen and the water.

If necessary, e.g., in connection with fish farming, the reactor can be combined with UV-treatment and/or ozone treatment of the water to kill bacteria and parasites, likewise the reactor at the inlet and/or outlet can be combined with a belt or cylindrical filter for filtration of coarse particles. Further, the reactor can be combined with flotation or stripping.

In a particular embodiment the invention is realized in a smaller biological water treatment plant for one or a few households. This is possible due to the extremely high efficiency of the reactor in combination with it being reliable and it requiring no daily surveillance by a skilled person and allowing its combination with a prefilter and other equipment, cf. above. The invention could, of course, also be utilized in larger water treatment plants.

Furthermore, the reactor according to the invention also proves suitable for denitification purposes but for this purpose it is obvious that oxygen should not be added as denitrification is a process running without the presence of oxygen. To minimize air absorption in the water, the water level in the reactor is raised such that the surface becomes calm, contrary to the hitherto described process where as rough a water surface as possible is intended to promote oxygen absorption.

Microfilm carriers being solid or hollow particles having outwardly extending portions which form an outwardly open cell structure prove suitable as the shape and mutual location are attuned such that the microfilm carriers by mutual influence in the water perform a cleaning of the microfilm on the particles but without risk of interlocking of the particles in large lumps. The effective surface of the particles during operation proves to be of the same size as the geometrical surface as the cleaning off of dead microorganisms from the biofilm is highly effective due to the outward extending portions, typically different in shape and length. Besides the microfilm carriers can be mineral-like particles having an irregular surface structure or be particles having caves, e.g., like the pattern on a golf ball. The microfilm carriers can also have passages such that the smaller particles can pass through the larger particles while the smallest particles are either solid or hollow, hereby a larger effective surface is achieved as a cleaning of the microfilm on the interior surfaces takes place as well.

The principle of the bio-reactor according to the invention is illustrated in the accompanying drawing, likewise various shapes of microfilm carriers according to the invention are shown.

BRIEF DESCRIPTION OF THE INVENTION

DETAILED DESCRIPTION OF THE PREFERRED EMBODIMENTS

Figure 1:
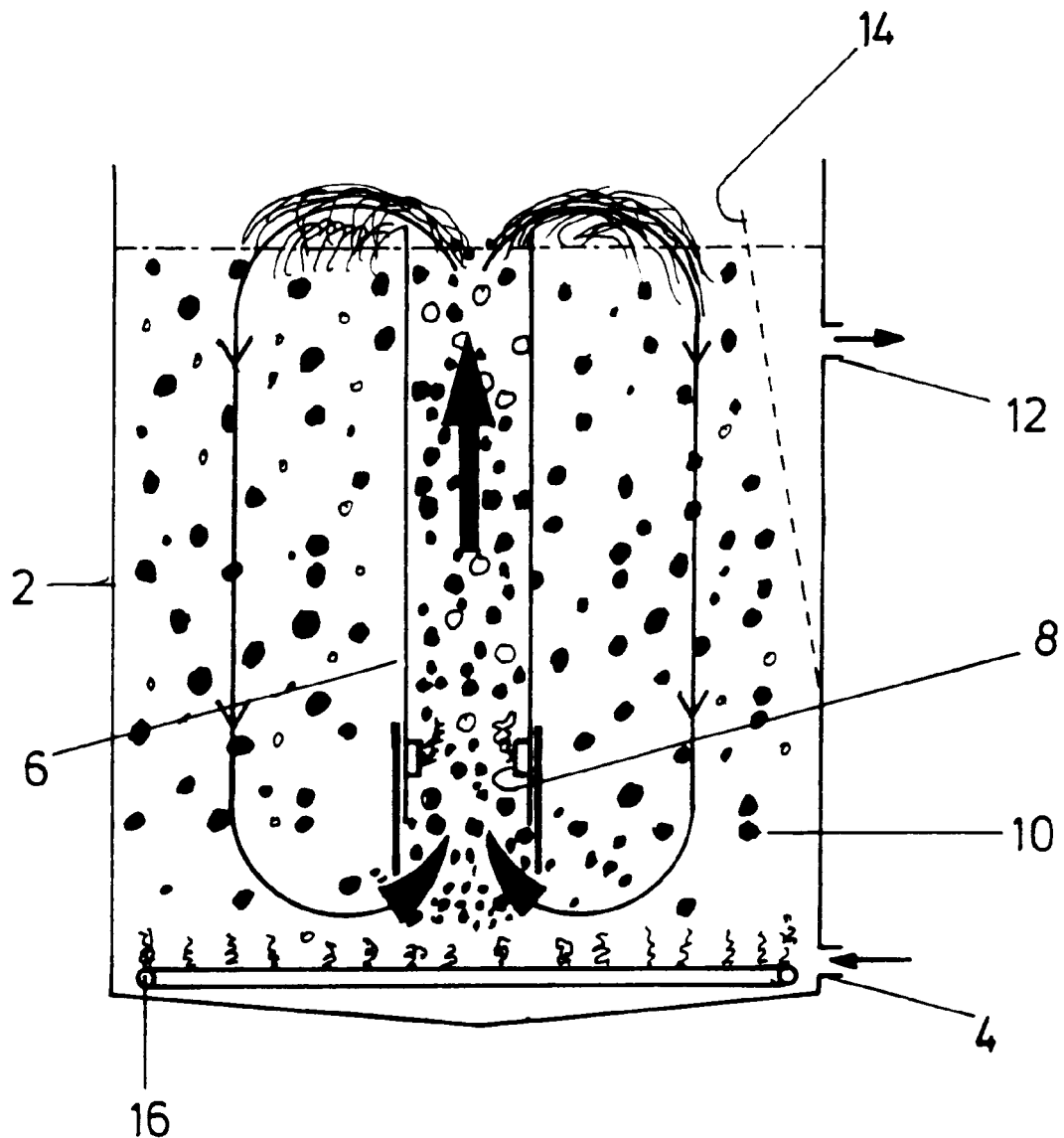
FIG. 1 is a cross sectional view of a preferred embodiment of the bioreactor according to the invention.

The bioreactor includes a cylindrical vessel 2 having an inlet 4 just above the bottom through which the water to be treated is introduced into the vessel. In the middle of the vessel, raised to a level over the inlet, is a vertical tube 6, which is adjustable in the vertical direction for adjusting the distance between the lower end of the tube and the bottom of the vessel, thereby adjusting the flow to the tube. For this purpose the tube can be furnished with a telescopic displaceable tube element. The level of the upper end of the tube in relation to the liquid surface is adjustable as well. In connection with the liquid inlet there can be arranged an air supply or oxygen supply to the tube, e.g., through a ring canal at the lower end of the tube, the canal having nozzles. Further, the flow in the tube can be controlled by the supply of air. In the vessel there are microfilm carriers 10 for purification of the water. An outlet 12 for the treated water is arranged at the top of the vessel, and to retain the microfilm carriers in the vessel a perforated plate or net 14 is placed in front of the outlet.

During operation there is created a flow up through the vertical tube 6 the flow being faster than the downward flow outside the tube. Accordingly the micro-film carriers are carried into the tube in which there constantly would be a high concentration of microfilm carriers, which contributes to an effective cleaning off of dead bio-material from the carriers. Besides, the central tube creates an effective flow circulation in the vessel which in itself contributes to the cleaning of the water.

To prevent areas of dead water at the side walls of the vessel, there is arranged air supply at the bottom through a circular pipe 16 having nozzles, the air supply creating creates an upward flow. A number of such pipes can be arranged in a concentric pattern. How close the pipes can be arranged to the tube 6 without disturbing the flow around this is a matter of experience.

It is obvious that additional purification, aeration, and/or denitrification equipment can be arranged before or after the reactor if necessary likewise a number of reactors can be mutually connected, each having different micro cultures for removing different types of contaminations.

Figure 2:
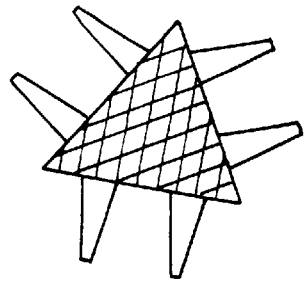
FIG. 2 is a cross sectional view of a pyramidal microfilm carrier or longitudinal carrier having a triangular cross section.
Figure 3:
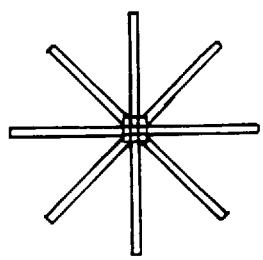
FIG. 3 is a cross sectional view of a ball-shaped microfilm carrier having quills.
Figure 4:
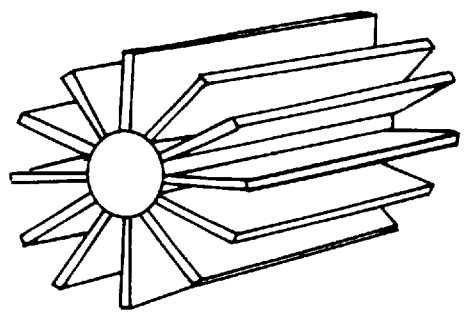
FIG. 4 is a perspective view of a circular cylindrical microfilm carrier having fins.

FIGS. 2–4 show microfilm carriers having a closed core furnished with extending quills or fins arranged in a comparatively scattered pattern and the length and the distance between the quills or fins being adapted such that the microfilm carriers run above each other without any risk of interlocking into major lumps for a longer period. By the internal sword-stroke between the quills or fins an effective abrasion of dead bio organisms from the microfilm will take place.

For all the embodiments it applies that they are preferably made of plastic and have a weight such that they are suspended in water or are a bit heavier. The specific weight can be a result of the specific weight of the plastic material or by the microfilm carrier being hollow in case the specific weight of the material used is too high.

Most of the microfilm carriers shown in the drawing are distinguished in that they can be produced by extrusion.

Figure 5:
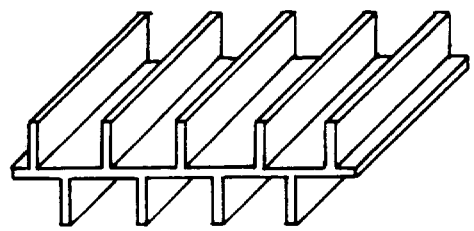
FIG. 5 is a perspective view of a microfilm carrier.
Figure 6:
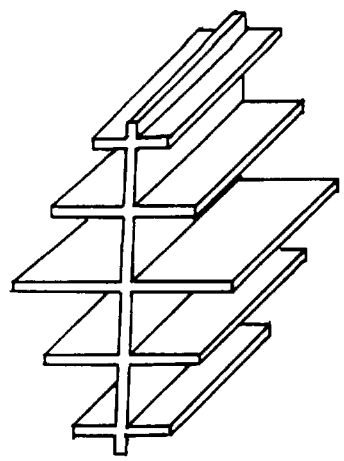
FIG. 6 is a perspective view of a third embodiment of a microfilm carrier.

The microfilm carrier shown in FIG. 5 includes a number of fins extending from a central wall. The fins can be arranged in a staggered pattern or be situated opposite each other. The fins can be of equal height or not, in the latter case as shown in FIG. 6. The shape and the number of fins can be chosen without limits, however, an embodiment where the fins unobstructed can slip into each other and perform an abrasion of the microfilm is preferred. The length and width of the microfilm carriers can be adapted to individual purposes. As the microfilm carriers have a relatively large plane, they will not easily sink to the bottom, also the upward flow has a larger attacking area which further prevents the microfilm carriers to sink.

Figure 7:
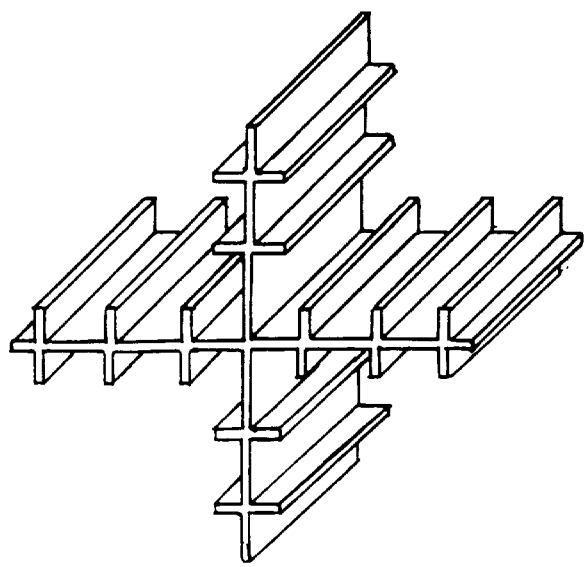
FIG. 7 is a perspective view of a fourth embodiment of a microfilm carrier.

In FIG. 7 is shown a first modification of the microfilm carrier design as a cross having fins at all its surfaces. This microfilm carrier can also readily be produced by extrusion.

Figure 8:
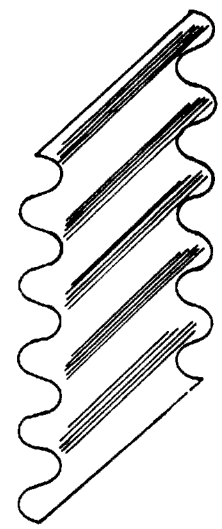
FIG. 8 is a perspective view of a modified embodiment of the microfilm carrier according to FIG. 5.

A further variant of the microfilm carrier is shown in FIG. 8. This carrier comprises a corrugated plate element which also can be extruded in plastic. The shape can be modified as mentioned above, likewise the height and length of the waves can be adapted to specific requirements. Also in this case an abrasion of the microfilm takes place when the carriers rub against each other, as it is understood that the waves fit into each other.

Figure 9:
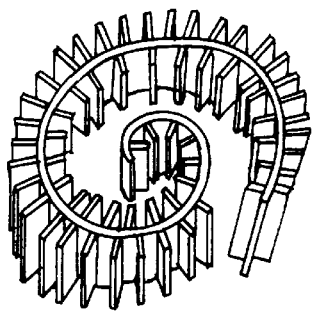
FIG. 9 is a perspective view of a further embodiment of the microfilm carrier.
Figure 10:
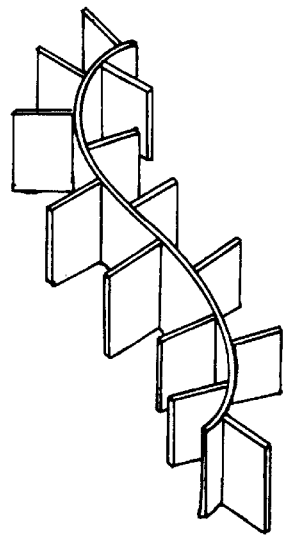
FIG. 10 is a perspective view of an even further embodiment of the microfilm carrier.
Figure 11:
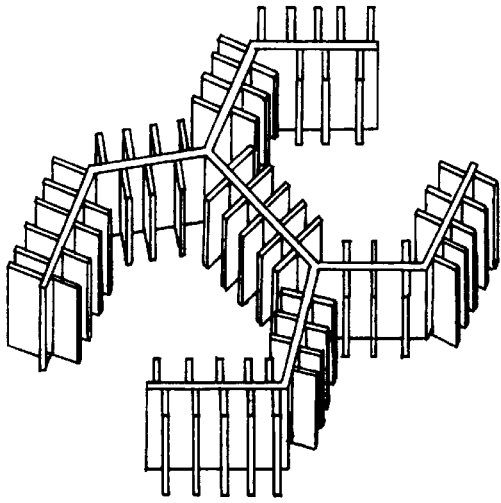
FIG. 11 is a perspective view of an even further embodiment of the microfilm carrier according to FIG. 9.

The microfilm carriers shown in FIGS. 9–11 can also be produced by extrusion and posses the same qualities as the carriers first mentioned.

Figure 12:
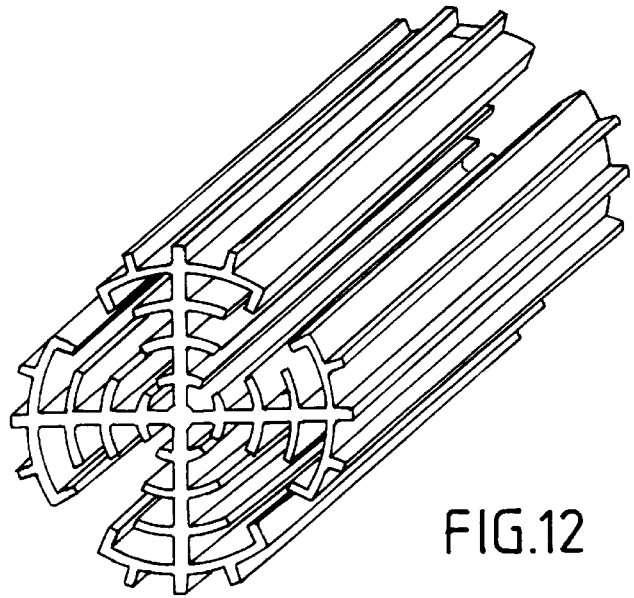
FIG. 12 is a preferred embodiment of the microfilm carrier.

A preferred embodiment of a microfilm carrier is shown in FIG. 12. Besides a number of concentric fins and radial extending ribs on the outer concentric fins, the carriers have additional inwardly-extending fins at the ends which prevent interlocking of the carriers. The embodiment is distinguished by a considerable high active surface and at the same time the production costs are low.

In summary the microfilm carriers can be distinguished by having an outwardly open surface structure form at the walls, fins and quills of the carriers.

Figure 13:
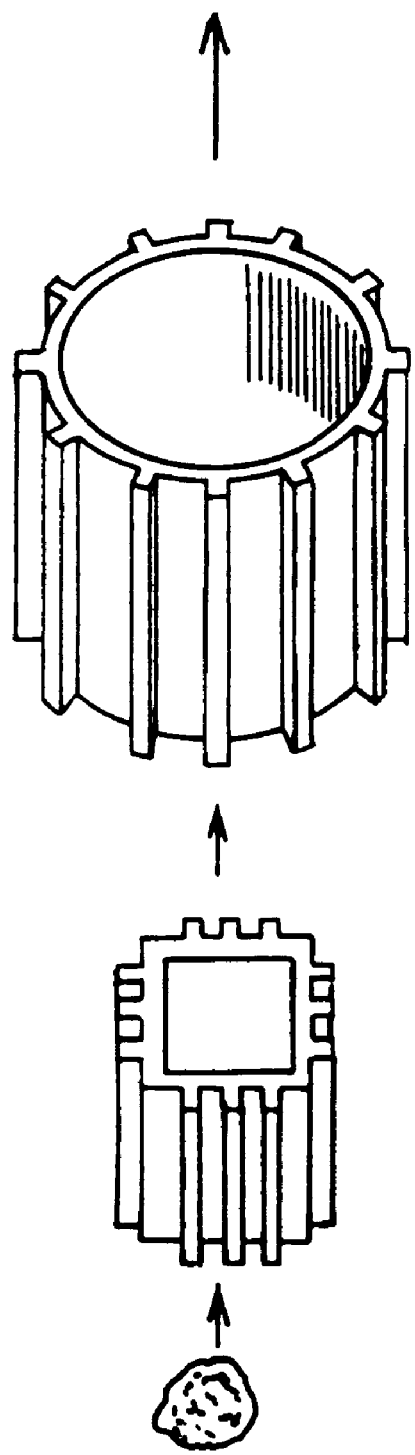
FIG. 13 is a system of microfilm carriers where the smaller carriers can pass through passages in the larger carriers.

In FIG. 13 shows a set of microfilm carriers where the smaller ones can pass through openings in the larger ones for abrasion of dead bio tissue in the interior of the carriers. The microfilm carrier is distinguished by a large active surface per volume due to the graduated sizes and due to the interior surfaces also being active.

By the design of the reactor and the operation of same and the design of the microfilm carriers, it is the microfilm or the carriers in principle are formed of three layers, where oxygen is able to penetrate through the two first layers to the underlying layer which appears to promote the activity of the microfilms.

Accordingly the invention renders it possible to produce a low cost microfilm carrier having a large surface and which could be kept suspended in the reactor, likewise the shape can be adapted to individual plant specifications.

Even though the present invention is especially aimed at purification of re-circulated water for aqua cultures, the invention is not limited to this purpose, the invention is also applicable in connection with cleaning of public waste water.

I claim:

1. A reactor for treating water which comprises a vessel having a side wall and a bottom, said vessel containing a plurality of particulate biofilm carriers on which a biofilm grows; a vertically-oriented pipe located in said vessel, said pipe defining a lower end which is spaced above said bottom of said vessel; circulation means for circulating water and biofilm carriers upwardly through said tube; inlet means for delivering water to be treated into said vessel; outlet means for removing treated water from said vessel, said outlet means being above said inlet means; and gas supply means for creating an upward flow of water adjacent said side wall of said vessel.

2. A reactor according to claim 1, including means for raising and lowering said lower end of said tube relative to said bottom of said vessel.

3. A reactor according to claim 1, wherein said circulation means comprises gas discharge means for discharging gas upwardly within said tube.

4. A reactor according to claim 3, wherein said gas discharge means is located within said tube near said lower end thereof.

5. A reactor according to claim 1, wherein said side wall of said vessel has a circular cross section and said gas supply means comprises a circular pipe having discharge nozzles therealong.

6. A reactor according to claim 1, wherein said tube is located centrally within said vessel.

7. A reactor according to claim 1, including a plurality of said vertically-oriented pipes.

8. In a method of treating water in a vessel containing particulate biofilm carriers and in which an area of circulating flow of water and concentrated amounts of biofilm carriers is created, the improvement wherein gas is supplied within said vessel to create an upward flow of stagnant water adjacent a side wall of said vessel.

* * * * *